(12) United States Patent
Iesaki

(10) Patent No.: US 8,866,432 B2
(45) Date of Patent: Oct. 21, 2014

(54) MOTOR CONTROL DEVICE AND IMAGE FORMING APPARATUS

(75) Inventor: Kenichi Iesaki, Ichinomiya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 369 days.

(21) Appl. No.: 13/431,175

(22) Filed: Mar. 27, 2012

(65) Prior Publication Data

US 2013/0070013 A1    Mar. 21, 2013

(30) Foreign Application Priority Data

Sep. 16, 2011    (JP) .................................. 2011-203501

(51) Int. Cl.
*G05B 11/01* (2006.01)
*B41J 29/38* (2006.01)
*B41J 11/42* (2006.01)

(52) U.S. Cl.
CPC ................. *B41J 29/38* (2013.01); *G05B 11/01* (2013.01); *B41J 11/42* (2013.01)
USPC ............................. 318/635; 318/560; 318/34

(58) Field of Classification Search
CPC ................................. G05B 11/01; B41J 29/38
USPC .......................................... 318/635, 560, 34
See application file for complete search history.

(56) References Cited

U.S. PATENT DOCUMENTS

| 6,140,792 A * | 10/2000 | Kameyama et al. .......... 318/685 |
| 7,462,998 B2 | 12/2008 | Akiyama |
| 2007/0075670 A1 | 4/2007 | Akiyama |
| 2012/0251213 A1 | 10/2012 | Iesaki |

FOREIGN PATENT DOCUMENTS

| JP | 07-302121 | 11/1995 |
| JP | 2007-086904 | 4/2007 |
| JP | 2007-221940 | 8/2007 |

OTHER PUBLICATIONS

Pending U.S. Appl. No. 13/362,083, filed Jan. 31, 2012.

* cited by examiner

*Primary Examiner* — David Luo
(74) *Attorney, Agent, or Firm* — Banner & Witcoff, Ltd.

(57) ABSTRACT

A motor control device comprises: a motor control unit that controls a motor; and a signal output unit that outputs a signal according to rotation of the motor, wherein the motor control unit controls the motor based on an output signal of the signal output unit so that a driven object driven by the motor is displaced to a target stop position. The motor control unit is configured to function as: a first control unit that estimates a upper current limit and controls the motor according to the upper current limit; a second control unit that controls motor according to an operated amount of at least one of the motor or the driven object; a switching unit that switches between the first control unit and the second control unit; a first calculating unit that calculates an amount necessary for stop; and a second calculating unit.

9 Claims, 9 Drawing Sheets

MOTOR CONTROL DEVICE AND IMAGE FORMING APPARATUS

CROSS-REFERENCE TO RELATED APPLICATION

This application claims priority from Japanese Patent Application No. 2011-203501 filed on Sep. 16, 2011, the entire subject matter of which is incorporated herein by reference.

TECHNICAL FIELD

This disclosure relates to a motor control device and an image forming apparatus.

BACKGROUND

As a technology capable of conveying a driven object to a target position at high speed, bang-bang control has been known.

The bang-bang control is superior in driving the driven object at high speed. However, the bang-bang control is a simple control method and thus it is difficult to stop the driven object at the target position at high speed by this control method. Meanwhile, as a technology for stopping driven object at a target position at high speed, there has been known feed back control based on a target profile (target trajectory).

SUMMARY

However, even when the method of setting a limit value of a control input based on a saturation current is used for the feedback control, it is difficult to achieve both of conveying a driven object to a target stop position and stopping the driven object at the target stop position.

Further, in this method, a variation occurs in time for stopping the driven object at the target stop position. When a variation occurs in the time for stopping the driven object at the target stop position, it may be not preferable. For example, due to the variation, products may disappoint user's expectations, and user may not satisfy.

With taking into consideration the above, this disclosure provides at least motor control device capable of improving the accuracy in stopping a driven object, which is driven member, at a target stop position, a reduction in time for stopping the driven object at the target stop position, and a suppression of variation in the time for stopping the driven object at the target stop position with balancing them.

In view of the above, a motor control device comprises: a motor control unit that controls a motor; and a signal output unit that outputs a signal according to rotation of the motor, wherein the motor control unit controls the motor based on an output signal of the signal output unit so that a driven object driven by the motor is displaced to a target stop position. The motor control unit is configured to function as: a first control unit; a second control unit; a switching unit; a first calculating unit; and a second calculating unit.

The first control unit may be configured to perform a first motor control, in which a upper current limit, which is an upper limit of current applicable to the motor and is adjusted by current degradation caused by a counter-electromotive force, is estimated based on the output signal of the signal output unit, and in which a first control input corresponding to the estimated upper current limit is determined as an control input of the motor and then motor is controlled based on the first control input.

Meanwhile, the second control unit may be configured to perform a second motor control, in which a second control input of the motor is determined based on both of at least one of a displacement amount and a speed, as an operated amount of at least one of the motor or the driven object, specified by the output signal of the signal output unit and an target trajectory of the operated amount and then the motor is controlled based on the second control input.

The switching unit may configured to enable the first control unit to perform the first motor control before a time point when a condition for start of the second motor control by the second control unit is satisfied and enable the second control unit to perform the second motor control, instead of the first control unit, after the time point when the condition for the start of the motor control by the second control unit is satisfied.

The first calculating unit is configured to calculate a displacement amount of the driven object from the time point of start of the motor control by the second control unit to the time point of stop of the driven object, as an amount necessary for stop, in case that the second control unit starts the controlling of the motor based on a standard target trajectory, which a target trajectory is determined based on both of the speed specified by the output signal of the signal output unit and elapsed time from a driving start time point of the driven object, wherein a time period from the driving start time point of the driven object to the driving stop time point of the driven object in the standard target trajectory is constant. Further, the second calculating unit is configured to calculate a remaining displacement amount of the driven object to the target stop position, based on the displacement amount specified by the output signal of the signal output unit.

Then, when the remaining displacement amount calculated by the second calculating unit reaches the amount necessary for stop calculated by the first calculating unit, the switching unit determines that the condition for start of the second motor control by the second control unit is satisfied and then starts the second motor control of the second control unit. When the remaining displacement amount calculated by the second calculating unit reaches the amount necessary for stop calculated by the first calculating unit, the switching unit determines that the condition for start of the second motor control by the second control unit is satisfied and then starts the second motor control of the second control unit, Examples of the above-mentioned target trajectory corresponding to the standard target trajectory are the same target trajectory as the standard target trajectory and a target trajectory obtained by correcting the standard target trajectory. An example of the correction on the standard target trajectory is a correction to finely adjust the standard target trajectory in accordance with the current position and operation state (such as the speed) of the driven object so that the driven object accurately stops at the target stop position.

According to this motor control device, based on the amount necessary for stop and the remaining displacement amount, the motor control is switched from the first motor control of the first control unit to the second motor control of the second control unit. Therefore, it is possible to continue the first motor control of the first control unit within a range, in which the first motor control of the first control unit has no influence on the accuracy of the stop, to move the driven object by nearly maximum high speed capability of the motor, and to stop the driven object at the target stop position with a high degree of accuracy. Further, according to this motor control device, it is possible to stop the driven object at the target stop position at high speed and with a high degree of accuracy, and to displace the driven object so that the time period from the driving start time point of the driven object to the stop time point of the driven object at the target stop position is constant.

Therefore, according to this disclosure, in the motor control device for stopping the driven object at the target stop position, it is possible to achieve an improvement in the accuracy in stopping a driven object at a target stop position, a reduction in time for stopping the driven object at the target stop position, and a suppression of variation in the time for stopping the driven object at the target stop position with balancing them.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
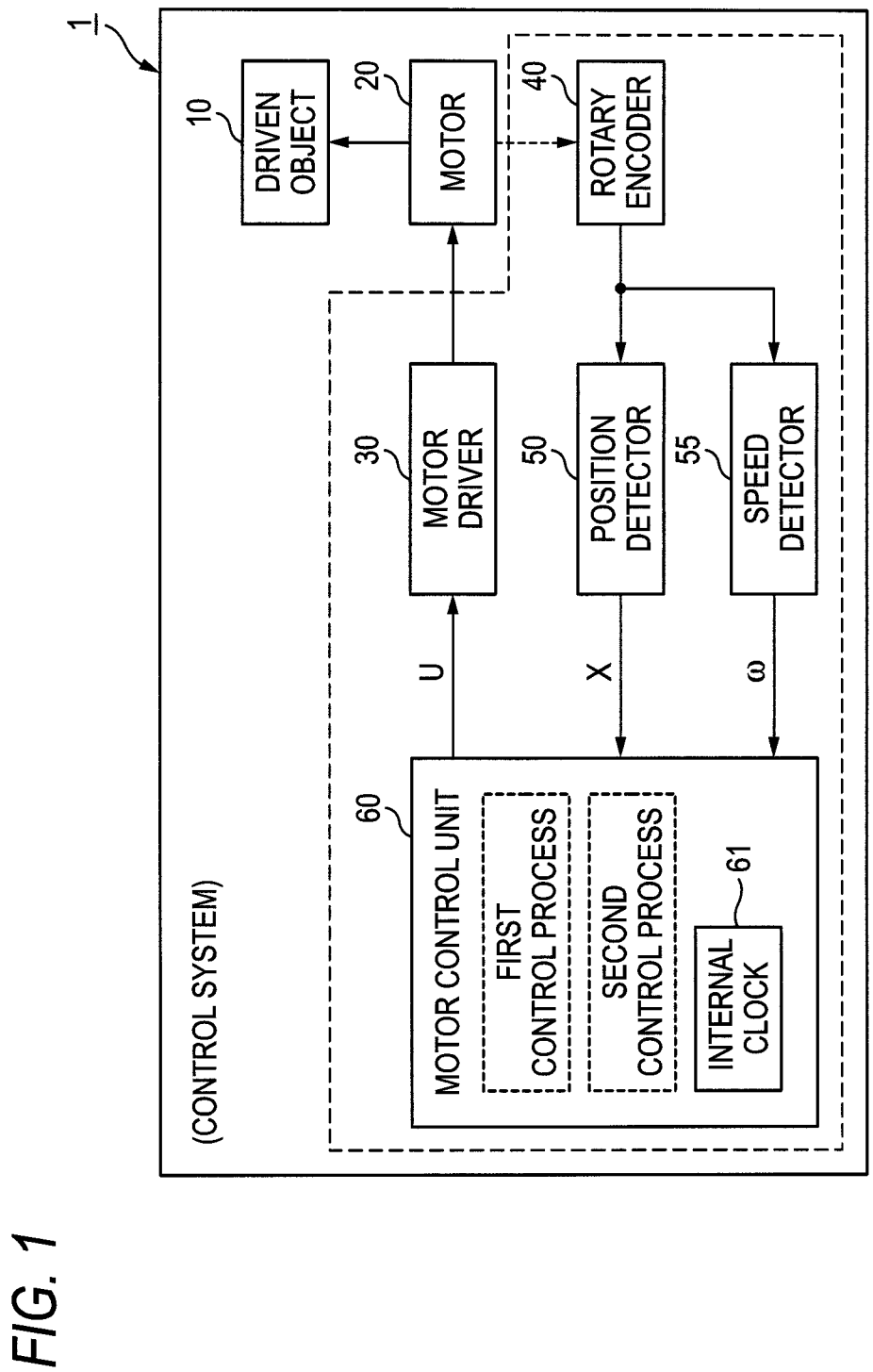
FIG. 1 is a block diagram illustrating a configuration of a control system.

Hereinafter, an illustrative embodiment of this disclosure will be described with reference to the accompanying drawings. As shown in FIG. 1, a control system 1 of the illustrative embodiment includes a motor (a DC motor) 20 for driving a driven object 10, a motor driver 30, a rotary encoder 40 connected to a rotation shaft of the motor 20, a position detector 50 for detecting the rotation position X of the motor based on an output signal of the rotary encoder 40, a speed detector 55 for detecting a rotation speed $\omega$ of the motor 20 based on the output signal of the rotary encoder 40, and a motor control unit 60 for calculating a current command value U which is a control input on the motor 20.

This control system 1 is incorporated in an electric apparatus such as an image forming apparatus, and performs motor control according to a command which is input from a main control unit (such as a main microcomputer) of the electric apparatus. Specifically, the driven object 10 is an example of a sheet conveying mechanism of an image forming apparatus.

Figure 2:
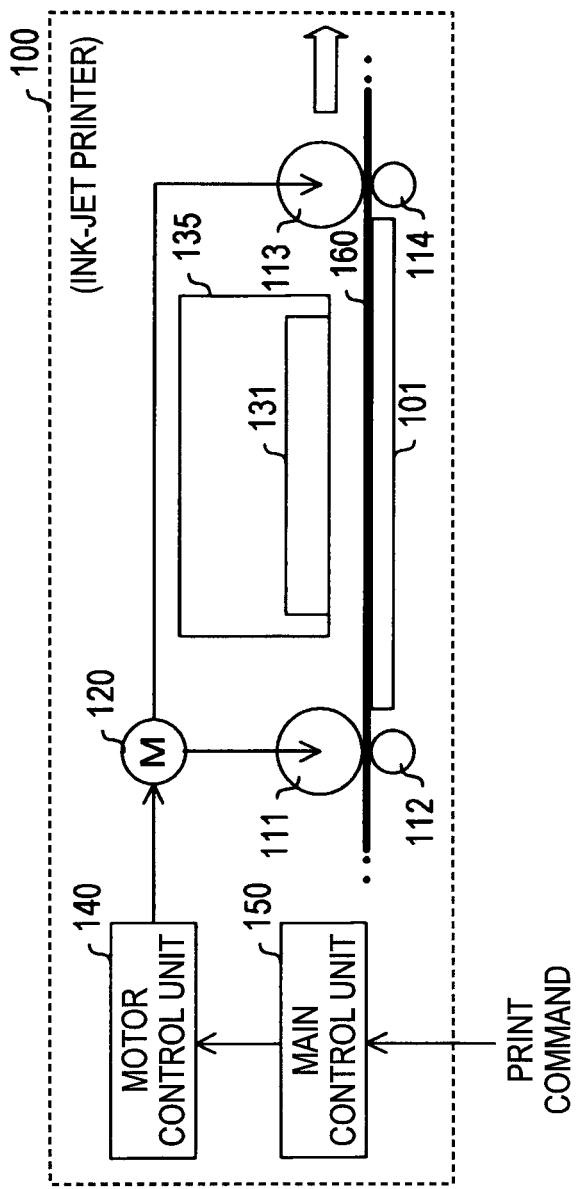
FIG. 2 is view illustrating a configuration of an ink-jet printer.

FIG. 2 illustrates a configuration of an ink-jet printer 100 which is an image forming apparatus. The ink-jet printer 100 include a conveyance roller 111 and a pinch roller 112 disposed upstream of a platen 101, and a discharging roller 113 and a pinch roller 114 disposed downstream of the platen 101. Further, the ink-jet printer 100 includes a recording head (a so-called ink-jet head) 131 capable of image forming on a sheet 160, and a carriage 135 for conveying the recording head 131, which are disposed on the platen 101. Furthermore, the ink-jet printer 100 includes a motor 120 for driving the conveyance roller 111 and the discharging roller 113, a motor control unit 140 for controlling the motor 120, and a main control unit 150 for performing integrated control on the entire ink-jet printer 100 by inputting a command to each of the internal units of the ink-jet printer 100 such as the motor control unit 140.

In this ink-jet printer 100, a sheet conveying mechanism mainly includes the rollers 111 to 114. The conveyance roller 111 and the discharging roller 113 receive power from the motor 120 to rotate in coordination with each other. In the sheet conveying mechanism, a sheet 160 is fed from a paper feed tray 160 (not shown), and the fed sheet 160 is pinched between the conveyance roller 111 and the pinch roller 112 and is conveyed downward by the rotation of the conveyance roller 111. When the sheet 160 is conveyed to the discharging roller 113 by the rotation of the conveyance roller 111, the sheet 160 is pinched between the discharging roller 113 and the pinch roller 114 and is conveyed downstream by the rotation of the discharging roller 113. According to the synchronous operations of the conveyance roller 111 and the discharging roller 113, the sheet 160 is discharged to a discharge tray (not shown). On the platen 101, the sheet 160 that is conveyed as described above is subject to an ink-drop ejecting operation of the recording head 131.

In the ink-jet printer 100, when receiving a print command from the outside, in order to form an image on the sheet 160 based on the image data of a print target designated by the print command, the main control unit 150 inputs a drive command to the motor control unit 140, for rotating the conveyance roller 111 and the discharging roller 113 by a predetermined amount. Accordingly, the motor control unit 140 controls the motor 120 so that the conveyance roller 111 and the discharging roller 113 rotate by the predetermined amount.

The main control unit 150 repeatedly input this drive command, whereby the motor control unit 140 sends the sheet 160 to an image formation position of the recording head 131 by predetermined amounts. Every time when the sheet 160 is sent by the predetermined amount, the recording head 131 performs the ink-drop ejecting operation based on the image data of the print target while being conveyed in a main scanning direction (a normal direction of the plane of FIG. 2) perpendicular to the conveyance direction of the sheet 160, thereby forming an image on the sheet 160 on the platen 101 based on the image data of the print target. When the sheet 160 is send by the predetermined amount is being stopped, the ink-drop ejecting operation of the recording head 131 is performed. When the ink-drop ejecting operation when the recording head 131 is conveyed once finishes, the sheet 160 is sent by the predetermined amount, once more. Every time when sending the sheet 160 by the predetermined amount as described above, the ink-jet printer 100 shown in FIG. 2 repeats the image forming operation on the sheet 160, and thus a set of images on the sheet 160 based on the image data of the print target is formed.

The control system 1 of the present illustrative embodiment may be incorporated in the ink-jet printer 100 having the above-mentioned configuration. Specifically, the components (components within a dotted line of FIG. 1) of the control system 1 other than the driven object 10 and the motor 20 may be incorporated in the ink-jet printer 100, as the motor control unit 140. In this case, the motor 120 of the ink-jet printer 100 corresponds to the motor 20 of the control system 1. Further, either the conveyance roller 111 and the discharging roller 113, or the sheet 160 corresponds to the driven object 10.

Since the ink-jet printer 100 forms the image on the sheet 160 while sending the sheet 160 by the predetermined amounts, when the sheet 160 is not accurately sent by the predetermined amounts, the quality of the image that is formed on the sheet 160 is deteriorated. Meanwhile, users desire high-speed printing. If throughput varies greatly depending on image forming apparatuses (products), users who own image forming apparatuses inferior in throughput may have complaints. Then, it is not always preferable that every image forming apparatus performs high-speed printing at its maximum throughput. Therefore, it is preferable to reduce a variation in throughput for each image forming apparatus.

When the control system 1 of the present illustrative embodiment is applied to a system requiring high speed, high accuracy, and a slight variation in throughput, the control system 1 is effective. Subsequently, the detailed configuration of the control system 1 will be described. The motor driver 30 (see FIG. 1) of the control system 1 receives the current command value U from the motor control unit 60, and inputs a driving current corresponding to the current command value U to the motor 20 so as to drive the motor 20.

Meanwhile, the rotary encoder 40 is a known rotary encoder which is connected to the rotation shaft of the motor 20 and outputs pulse signals every time when the motor 20 rotates by the predetermined amount. The rotary encoder 40 outputs, as the pulse signals, a phase-A signal and a phase-B signal which are different from each other by π/2 in phase. The position detector 50 detects the rotation position X of the motor 20 based on the phase-A signal and the phase-B signal output from the rotary encoder 40. Then, the position detector 50 outputs information on the detected rotation position X to the motor control unit 60. Meanwhile, the speed detector 55 detects the rotation speed ω of the motor 20 based on the phase-A signal and the phase-B signal output from the rotary encoder 40, and inputs information on the rotation speed w to the motor control unit 60.

Then, when receiving the drive command from the outside (for example, the main control unit 150), the motor control unit 60 conveys the driven object 10 by a target conveyance amount Pt designated with the drive command.

Figure 3:
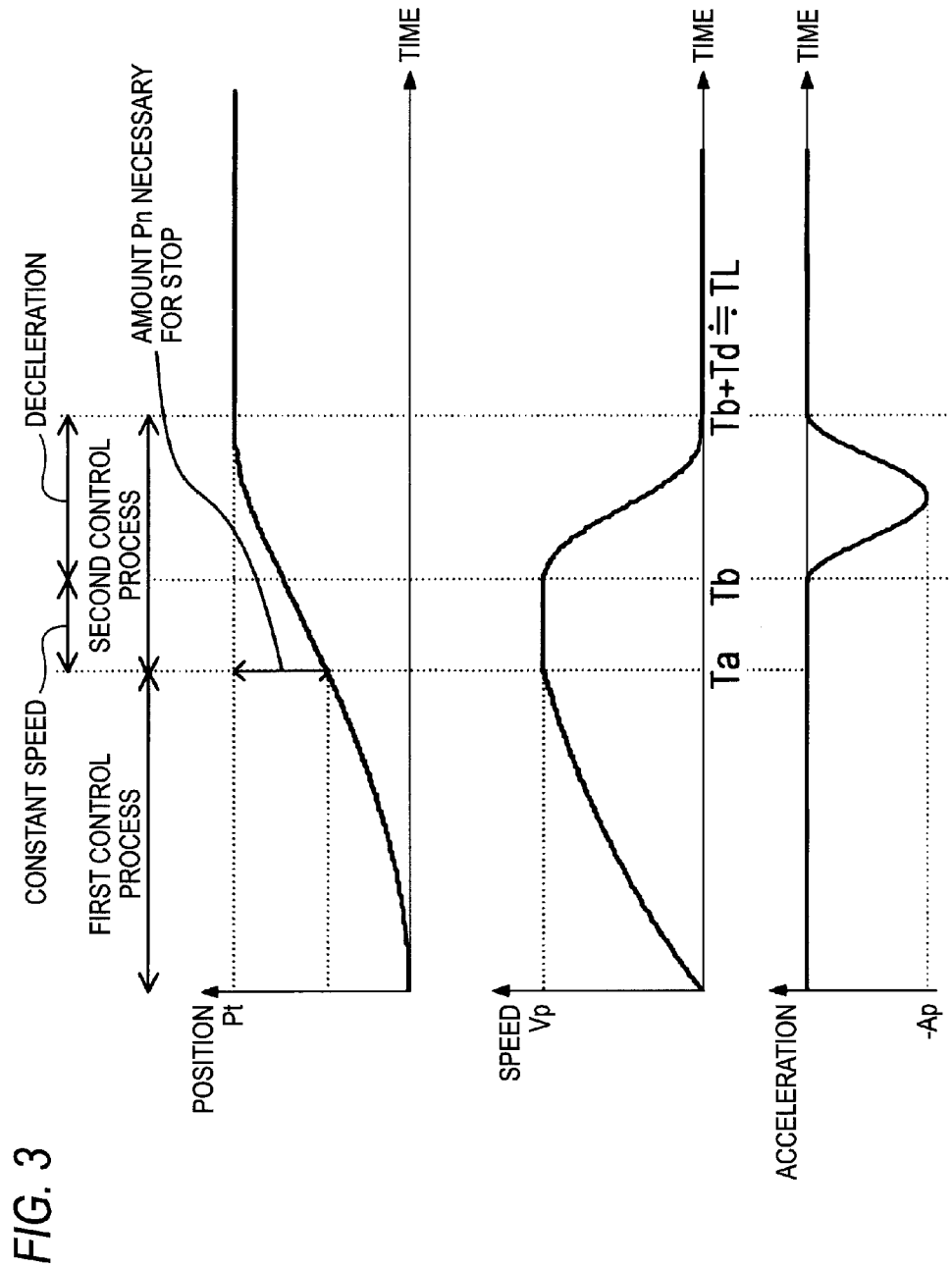
FIG. 3 illustrates graphs illustrating trajectories of the position, speed, and acceleration of a driven object 10 according to control of the control system.

Specifically, when receiving the drive command, in order to move the driven object 10 to a position corresponding to the target conveyance amount Pt, the motor control unit 60 performs switching between a first control process and a second control process using different control methods in accordance with a predetermined condition, and perform a control process according to the predetermined condition. In other words, as shown in FIG. 3, at the beginning of driving control on the driven object 10, the motor control unit 60 performs the first control process, and when the predetermined condition is satisfied, the motor control unit 60 performs the second control process, instead of the first control process.

In the first control process, based on the information on the rotation speed ω of the motor 20 received from the speed detector 55, the motor control unit 60 calculates a upper current limit Umax, which is applicable to the motor 20, by a predetermined arithmetic expression Um(ω), as a current amount adjusted by current degradation caused by a counter-electromotive force at the rotation speed ω. Then, the motor control unit 60 inputs the current command value U (=Umax), corresponding to the calculated upper current limit Umax, to the motor driver 30. According to this control, the driven object 10 is conveyed by nearly maximal capability of the motor 20.

The arithmetic expression Um(ω) usable for calculating the upper current limit Umax may be experimentally obtained in advance. In a case of theoretically determining the arithmetic expression Um(ω), based on the rated voltage Vmax of the motor 20, the electromotive force coefficient Ke of the motor 20, and armature resistance Ra, the arithmetic expression Um(ω) may be determined by the following equation.

[Equation 1]

$$U_m(\omega) = \frac{V_{max} - K_e \cdot \omega}{R_a} \quad (1)$$

Figure 4:
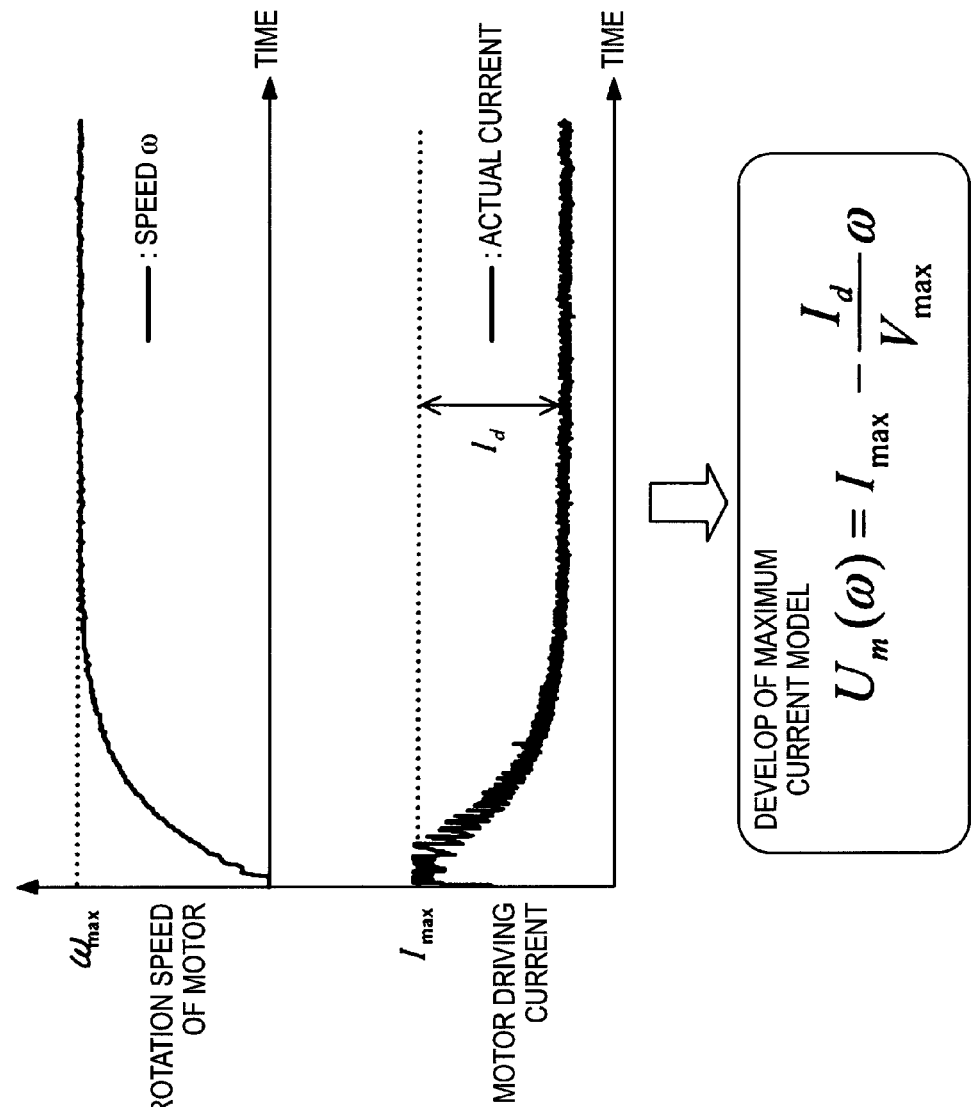
FIG. 4 is a view illustrating a method of deriving a function $Um(\omega)$ for calculating a upper current limit.

On the other hands, in a case of experimentally determining the arithmetic expression Um(ω), as shown in FIG. 4, based on a maximum rotation speed ωmax of the motor 20 and the a current degradation amount Id.

The maximum rotation speed ωmax is obtained when the motor 20 is driven by a maximum current amount Imax applicable when the counter-electromotive force has no effects, in other words, when the rotation speed of the motor 20 is zero, and current amount Id is a amount degraded from the maximum current amount Imax in the driving current flowing in the motor 20 at that time. The arithmetic expression Um(ω) may be determined by the following equation.

[Equation 2]

$$U_m(\omega) = I_{max} - \frac{I_d}{\omega_{max}} \cdot \omega \quad (2)$$

Thus, the arithmetic expression Um(ω) is theoretically or experimentally determined. However, in the case of theoretically obtaining the arithmetic expression Um(ω), the upper current limit Umax may not be accurately calculated based on the arithmetic expression Um(ω) due to the influence of an error of a catalog value. For this reason, it is preferable to experimentally determine the arithmetic expression Um(ω).

When the motor control unit 60 performs the second control process instead of the first control process, the motor control unit 60 calculates the current command value U so that a position (conveyance amount) P and a speed V of the driven object 10 follow the target profiles, based on the position P of the driven object 10 from a drive start position (the position when the motor control unit 60 starts the first control process) of the driven object 10 which is specified from the rotation position X of the motor 20 detected by the position detector 50, the speed V of the driven object 10 which is specified from the rotation speed w of the motor 20 detected by the speed detector 55, and target profiles (that is, target trajectories) regarding the position P and speed V of the driven object 10. Then, the motor control unit 60 inputs the current command value U to the motor driver 30, so that the motor control unit 60 controls the position P and speed V of the driven object 10 to target values.

Specifically, in the second control process, a feedback control system, or a two-degree-of-freedom control system configured by a feedback control system and a feed-forward control system can be used to calculate the current command value U. The function for calculating the current command value U is set by a known method based on the features of the driven object 10.

In the present illustrative embodiment, the first control process and the second control process having the above-mentioned configurations are alternatively performed, so that the driven object 10 is conveyed to the position corresponding to the target conveyance amount Pt at high speed with a high degree of accuracy. In the present illustrative embodiment, the motor 20 is controlled so that, as shown in FIG. 3, after the start of the second control process, the driven object 10 is not immediately decelerated, but the driven object 10 is moved at a constant speed and then is decelerated and stopped. Therefore, the driven object 10 is accurately stopped at the position (hereinafter, referred to as a target stop position) corresponding to the target conveyance amount Pt. In other words, in the second control process of the present illustrative embodiment, the target profiles including a constant speed section and a deceleration section are used to decelerate and stop the driven object 10.

In the first control process, since the current command value U corresponding to the upper current limit Umax is input to the motor driver 30 so that the driven object 10 is driven by nearly maximal capability of the motor 20, even when it is tried to immediately decelerate the driven object 10 in the second control process, it is difficult to accurately decelerate and stop the driven object 10. Accordingly, in this disclosure, since the constant speed section is provided before the deceleration section, it is possible to decelerate the driven object 10 in accordance with the target profiles, and accurately stop the driven object 10 at the target stop position Pt.

In the present illustrative embodiment, in order to decelerate and stop the driven object 10 by nearly maximal capability of the motor 20, the target profiles in the deceleration section are set so that a peak value of a target acceleration Ar in the deceleration section becomes a uniformed value −Ap corresponding to the maximum capability of the motor, regardless of the speed V of the driven object 10 when the deceleration starts. In the present illustrative embodiment, the above-mentioned method of decelerating and stopping the driven object 10 is used to lengthen time to accelerate the driven object 10 by the first control process, and to rapidly stop the driven object 10 at the target stop position Pt.

In the control system 1 of the present illustrative embodiment, standard target profiles (hereinafter, referred to as standard profiles) are defined. The standard profiles indicate the trajectories of the standard target acceleration, target speed, and target position of the driven object 10 in the second control process. The switching from the first control process to the second control process is performed based on a result of estimation of a movement distance of the driven object 10 from starting of the second control process to stopping of the driven object 10 by the second control process based on the standard profiles.

Specifically, in the present illustrative embodiment, in a case of performing the second control process using the standard profiles to decelerate and stop the driven object 10, an amount Pn necessary for stop, which is the movement distance of the driven object 10 from starting of the second control process to stopping of the driven object 10, is calculated. Meanwhile, the remaining conveyance amount Ps, which is a distance from a current position P of the driven object 10 to the target stop position Pt, is calculated. Then, when the remaining conveyance amount Ps becomes equal to or less than the amount Pn necessary for stop, the control on the driven object 10 is switched from the first control process to the second control process. This switching is performed so that the driven object 10 is driven by the upper current limit Umax and is conveyed by a relatively long distance at high speed, and so that, after the first control process, the driven object 10 is stopped at the target stop position Pt based on an acceleration trajectory, a speed trajectory, and a position trajectory corresponding to the standard profiles, with a high degree of accuracy.

Further, in the present illustrative embodiment, the target profiles are defined as the standard profiles so that driving time from starting of driving the driven object 10 (that is, when the first control process starts) to stopping of the driven object 10, becomes a predetermined value TL, and the amount Pn necessary for stop is calculated based on the standard profiles. Therefore, the driving time from starting of driving to stopping of driving of the driven object 10 generally becomes the predetermined value TL.

Specifically, the standard profiles are determined the target acceleration Ar, target speed Vr, target position Pr of the driven object 10 at each time point t in the constant speed section, and the target acceleration Ar, target speed Vr, target position Pr of the driven object 10 at each time point t in the deceleration section as follow.

<Constant Speed Section>

$$\text{Target Acceleration } Ar=0 \quad (3)$$

$$\text{Target Speed } Vr=Vm \quad (4)$$

$$\text{Target Position } Pr=Vm\cdot(t-Ta)+Pm \quad (5)$$

<Deceleration Section>
Target Acceleration

[Equation 3]

$$A_r = -\frac{V_m}{T_d}\left\{1 - \cos\left(\frac{2\pi}{T_d}(t - T_b)\right)\right\} \quad (6)$$

$$T_d = 2 \times \frac{V_m}{A_p} \quad (7)$$

$$T_b = TL - T_d \quad (8)$$

Target Speed

[Equation 4] \quad (9)

$$V_r = \int_{T_b}^{t} A_r \, dt + V_m$$

Target Position

[Equation 5] \quad (10)

$$P_r \int_{T_b}^{t} V_r \, dt + P_m + V_m(T_b - T_a)$$

The constant speed section corresponds to a time period from a time point Ta to a time point Tb, and the deceleration section corresponds to a time period from the time point Tb to a time point TL. Here, the reference symbol 't' represents time (elapsed time) from starting of the driving of the driven object 10, the reference symbol 'Ta' represents a time point when the constant speed section starts in a time system of time t (that is, a time point when control based on the standard profiles starts), and the reference symbol 'Tb' represents a time point (hereinafter, referred to as a deceleration start time point) when the deceleration section starts in the time system of time t. Further, the reference symbol 'Pm' represents the position P of the driven object 10 when the control based on the standard profiles starts, and the reference symbol 'Vm' represents the speed V of the driven object 10 when the control based on the standard profiles starts.

Furthermore, the reference symbol 'Td' represents the time period of the deceleration section (deceleration time period), and the reference symbol 'Ap' represents the absolute value of a peak value of the target acceleration Ar in the deceleration section. Additionally, the reference symbol 'TL' represents a target time period from starting of the driving to stopping of the driving of the driven object 10, that is, a target drive time period.

In a case of performing the second control process according to those standard profiles, it is possible to calculate the amount Pn necessary for stop by the following equations, using the speed V of the driven object 10 when the first control process finishes, as the speed Vm, and using the time t when the first control process finishes, as the time point Ta.

$$Pn = Pc + Pd \quad (11)$$

$$Pc = Vm \cdot (TL - Td - Ta) \quad (12)$$

$$Pd = Vm^2/Ap \quad (13)$$

Here, the reference symbol 'Pc' represents a movement amount of the driven object 10 in the constant speed section (hereinafter, referred to as a constant speed distance), and the reference symbol 'Pd' represents a movement amount of the driven object 10 in the deceleration section (hereinafter, referred to as a deceleration distance). As described above, TL is the target drive time period which is determined to a constant value in advance and is the target drive time period to convey the driven object 10 by the target conveyance amount Pt. According to conveying conditions or the like, a plurality of target conveyance amounts may be determined. In this case, with respect to each target conveyance amount, a target drive time period may be determined. The value Ap is determined to a uniformed value according to the capability of the motor 20 in advance by the designer of the control system 1, and the time period Td is automatically determined by Equation 7 based on the speed Vm and the value Ap.

Therefore, in order to determine whether to switch the driving control on the driven object 10 from the first control process to the second control process, the motor control unit 60 may calculate the amount Pn necessary for stop and the remaining conveyance amount Ps (=Pt−P) at that time, based on the speed V of the driven object 10 that is specified from the rotation speed w detected by the speed detector 55 when the determination is performed, the position P of the driven object 10 that is specified from the rotation position X detected by the position detector 50 when the determination is performed, and elapsed time t from starting of the driving of the driven object 10, and then compares the amount Pn necessary for stop and the remaining conveyance amount Ps. Further, the elapsed time (current time t) from starting of the driving of the driven object 10 starts may be specified by an internal clock 61 of the motor control unit.

Subsequently, the details of the main control process which the motor control unit 60 periodically performs when receiving the drive command will be described with reference to FIG. 5. The main control process is for conveying the driven object 10 to the target stop position Pt designated by the drive command. When the main control process shown in FIG. 5 starts, first, in step S110, the motor control unit 60 specifies the current position P of the driven object 10 based on the rotation position X of the motor 20 detected by the position detector 50, and specifies the current speed V of the driven object 10 based on the rotation speed ω of the motor 20 detected by the speed detector 55. Further, in step S110, the motor control unit 60 specifies the elapsed time (current time) t from starting of the drive command was input so that the driving control on the driven object 10 started, based on the internal clock 61. Since the motor 20 and the driven object 10 are connected to each other, as a matter of course, it is possible to specify the position P and speed V of the driven object 10 from the rotation position X and rotation speed ω of the motor 20.

Next, in step S120, the motor control unit 60 determines whether a value of a flag F is 1. The flag F is set to a value of 0 when a drive command is input, and is set to a value of 1 when the process of step S195 is performed. When it is determined that the value of the flag F is 0 (No in step S120), in step S130, the motor control unit 60 calculates a constant-speed time period Tc, which is the time period of the constant speed section when the control according to the standard profiles has started, based on the current speed V of the driven object 10 and the current time point t specified in step S110.

$$Tc = TL - (t + Td)$$

As described above, a deceleration time period Td is calculated in accordance with an equation of (Td=2·V/Ap) based on the current speed V of the driven object 10 and an absolute value Ap of an acceleration peak value of the deceleration section predetermined. The reference symbol 'TL' represents a target drive time period set in advance.

Next, in step S140, the motor control unit 60 determines whether the constant-speed time period Tc calculated in step S130 is less than a predetermined lower limit Tcm. Then, when it is determined that the constant-speed time period Tc is not less than the lower limit Tcm (No in step S140), the motor control unit 60 performs the process of step S150, and then proceeds to step S160. When it is determined that the constant-speed time period Tc is less than the lower limit Tcm (Yes in step S140), the motor control unit 60 performs the process of step S155, and then proceeds to step S160. The lower limit Tcm corresponds to a minimum constant-speed time period determined so that the driven object 10 is stably conveyed, as will be described below.

In step S150, the motor control unit 60 calculates a deceleration distance Pd (=V²/Ap) and a constant-speed distance Pc (=V·Tc) of a case where the control according to the standard profiles starts at the current time, based on the speed V specified in step S110 and the constant-speed time period Tc calculated in step S130. Then, the motor control unit 60 calculates the amount Pn (=Pc+Pd=V·Tc+V²/Ap) necessary for stop when the control according to the standard profiles starts at the current time, based on the deceleration distance Pd and the constant-speed distance Pc. In the above-mentioned Equations 3 to 7, 9, and 10, the time point Ta is set to the current time point t specified in step S110, the time point Tb is set to (Ta+Tc), the speed Vm is set to the speed V specified in step S110, and the position Pm is set to the position P specified in step S110, and then the standard profiles corresponding to the current time point t are obtained.

Meanwhile, in step S155, the constant-speed distance Pc (=V·Tcm) and the deceleration distance Pd (=V²/Ap) it is calculated, instead of the control according to the standard profiles, control according to semi-standard profiles obtained by correcting the constant-speed time period of the standard profiles to the lower limit Tcm is performed at the present time, based on the speed V specified in step S110 and the above-mentioned lower limit Tcm. In the above-mentioned Equations 3 to 7, 9, and 10, the time point Ta is set to the current time point t, the time point Tb is set to (Ta+Tcm), the speed Vm is set to the speed V specified in step S110, and the position Pm is set to the position P specified in step S110, and then the semi-standard profiles corresponding to the current time point t are obtained. As a result, the motor control unit 60 calculates the amount Pn (=Pc+Pd=V·Tcm+V²/Ap) necessary for stop when the control according to the semi-standard profiles starts at the current time, based on the deceleration distance Pd and the constant-speed distance Pc.

When the constant-speed time period Tc calculated in step S130 is less than the lower limit Tcm, it can be considered that the load of the driven object 10 is higher than normal. In other words, in case that the load of the driven object 10 is high, and the speed of the driven object 10 does not increase even when time elapses, positive determination is not performed in step S170 (to be described below) at all, and the current time point t increases, so that the constant-speed time period Tc that is calculated in step S130 decreases. When the constant-speed time period Tc is decreased, the driven object 10 is decelerated immediately from the constant speed state. Therefore, it becomes impossible to stably convey the driven object 10. For this reason, in the present illustrative embodiment, the lower limit Tcm of the constant-speed time period is provided, so that the driving in the target drive time period TL is not performed, and then the constant-speed time period is secured so that the accuracy of the conveyance of the driven object 10 is not reduced, and a larger target drive time period TL is estimated.

Next, in step S160, the motor control unit 60 calculates the remaining conveyance amount Ps (=Pt−P) up to the target stop position Pt, based on the position P specified in step S110 and the target stop position Pt designated by the drive command. Subsequently to step S160, in step S170, the motor control unit 60 determines whether the remaining conveyance amount Ps is equal to or less than the amount Pn necessary for stop, thereby determining whether the remaining conveyance amount Ps reaches the amount Pn necessary for stop.

Then, when it is determined that the remaining conveyance amount Ps is larger than the amount Pn necessary for stop (No in step S170), the motor control unit 60 performs the above-mentioned first control process so as to input the current command value U (=Umax) corresponding to the upper current limit Umax to the motor driver 30. According to this control, in case that the remaining conveyance amount Ps is larger than the amount Pn necessary for stop, the driven object 10 is conveyed by nearly maximum capability of the motor 20. Next, the main control process shown in FIG. 5 is finished once, and the main control process shown in FIG. 5 is periodically restarted at the next performance timing.

The motor control unit 60 repeatedly performs the process having those configurations, so that the motor 20 is driven by the driving current corresponding to the upper current limit Umax until the remaining conveyance amount Ps becomes equal to or less than the amount Pn necessary for stop. Then, when the remaining conveyance amount Ps becomes equal or less than the amount Pn necessary for stop, positive determination is performed in step S170 (Yes in step S170), the motor control unit 60 proceeds to step S191.

When proceeding to step S191, the motor control unit 60 sets the current time point t to the start time point Ta of the constant speed section (that is, the start time point of the second control process), sets the position P of the driven object 10 at that time point specified in step S110, as the initial position Pm of the driven object 10 when the second control process starts, and sets the speed V of the driven object 10 at the same time point, as the initial speed Vm of the driven object 10 when the second control process starts.

Next, in step S193, the motor control unit 60 calculates a constant-speed time period Tcr to be performed by the second control process, by the following Equation, based on the position Pm, the speed Vm, the target stop position Pt, and the deceleration distance Pd (=Vm²/Ap).

$$Tcr=(Pt-Pm-Pd)/Vm \quad (14)$$

Then, in step S193, the motor control unit 60 sets the time point Tb to (Ta+Tcr) by using the constant-speed time period Tcr, thereby determining the target profiles to be used in the second control process. In other words, the motor control unit 60 substitutes the position Pm, the speed Vm, and the time points Ta and Tb set in steps S191 and S193, into Equations 3 to 7, 9, and 10, so as to obtain target profiles, and determines the target profiles, as the target profiles to be used in the second control process corresponding to the standard profiles in this time. Therefore, even when a timing when the remaining conveyance amount Ps is equal to the amount Pn necessary for stop is deviated from the performance timing of the main control process, it becomes possible to accurately stop the driven object 10 at the target stop position. In this case, although the actual driving time period may be deviated from the target drive time period TL by up to one cycle of the main control process, since one cycle of the main control process is very smaller than the target drive time period TL, the deviation has no influence.

As described above, in the present illustrative embodiment, the motor control unit 60 corrects the deceleration start time point Tb in the standard profiles, to the time point capable of accurately stopping the driven object 10 at the target stop position Pt, based on a relation between the current position P, the target stop position Pt, the deceleration distance Pd, and the speed Vm of the constant speed section, not based on the time point according to Equation 8, thereby determining the target profiles to be used in the second control process.

When the motor control unit 60 calculates the amount Pn necessary for stop according to the semi-standard profiles in step S155 and when the remaining conveyance amount Ps becomes equal to or less than the amount Pn necessary for stop, the motor control unit 60 performs positive determination in step S170 and performs the processes of steps S191 and S193, then the motor control unit 60 performs the same correction on the deceleration start time point Tb, thereby determining the target profiles obtained by finely adjusting the constant-speed time period of the semi-standard profiles to the value Tcr, as the target profiles to be used in the second control process.

Figure 5:
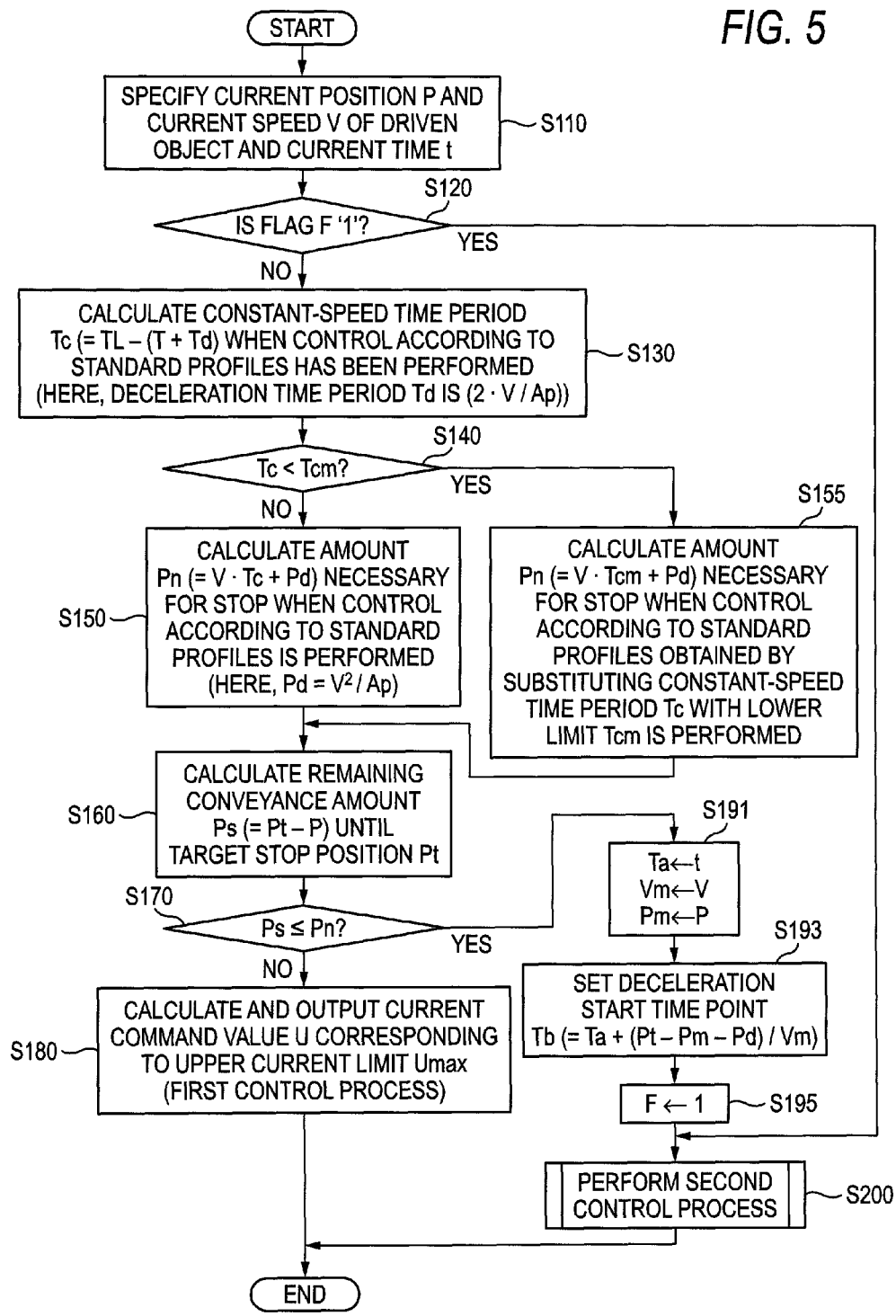
FIG. 5 is a flow chart illustrating a main control process of a motor control unit.
Figure 6:
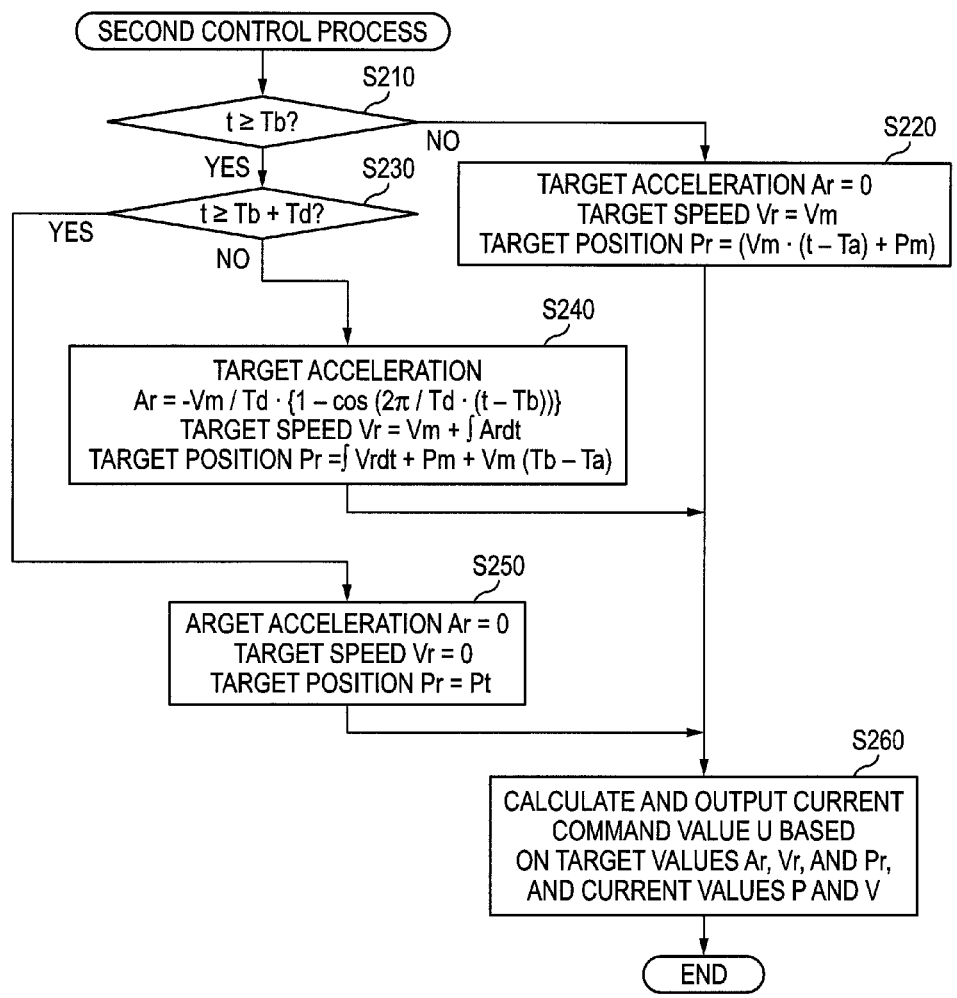
FIG. 6 is a flow chart illustrating a second control process that is performed in the main control process.

Next, the motor control unit 60 updates the flag F with the value of 1 in step S195 and performs the second control process shown in FIG. 6 in step S200. After performing the second control process, the motor control unit 60 finishes once the main control process shown in FIG. 5, and performs again the main control process at the net performance timing coming periodically. In this case, since the flag F has the value of 1, the motor control unit 60 performs positive determination in step S120, immediately proceeds to step S200 and then performs the second control process. The motor control unit 60 repeatedly performs the above-described main control process, thereby continuously performing the driving control on the driven object 10 according to the second control process in case that the remaining conveyance amount Ps becomes equal to or less than the amount Pn necessary for stop.

Subsequently, the details of the second control process will be described with reference to FIG. 6. When the second control process shown in FIG. 6 starts, in step S210, the motor control unit 60 determines whether the deceleration start time point Tb has come, based on the current time point t. Then, when it is determined that the deceleration start time point Tb has not come (t<Tb) (No in step S210), in step S220, in accordance with the target profiles determined in the processes of steps S191 and S193, the motor control unit 60 sets 0 as the target acceleration Ar which is a target value of the acceleration A of the driven object 10 at the current time point t, sets Vr (=Vm) as the target speed Vr which is the target value of the speed V of the driven object 10, and sets Pr (=Vm·(t−Ta)+Pm) as the target profile Pr which is the target value of the position P of the driven object 10. Next, the motor control unit 60 proceeds to step S260 in which the motor control unit 60 calculates the current command value U for the motor 20 to reduce an error between the position P and speed V of the driven object 10 and the target values, based on the above-mentioned set target values (the target acceleration Ar, the target speed Vr, and the target position Pr) and the current position P and speed V of the driven object 10 specified in the process of step S110, and then inputs the calculated current command value U to the motor driver 30. Then, the motor control unit 60 finishes the second control process. According to this control, the motor control unit 60 performs the driving control on the driven object 10 so that the driven object 10 moves at the constant speed Vm in a time section from the time point Ta to the time point Tb.

Meanwhile, when it is determined that the deceleration start time point Tb has come (t≥Tb) (Yes in step S210), in step S230, the motor control unit 60 determines whether the end time point (Tb+Td) of the deceleration section has come, based on the current time point t. Then, when it is determined that the end time point (Tb+Td) of the deceleration section has not come (t<(Tb+Td)) (No in step S230), in step S240, the motor control unit 60 sets the target acceleration Ar at the current time point t in accordance with Equation 6, sets the target speed Vr in accordance with Equation 9, and sets the target position Pr in accordance with Equation 10. Next, the motor control unit 60 proceeds to step S260 in which the motor control unit 60 calculates the current command value U for the motor 20 to reduce an error between the position P and speed V of the driven object 10 and the target values, based on the above-mentioned set target values (the target acceleration Ar, the target speed Vr, and the target position Pr) and the position P and speed V of the driven object 10 specified in the process of step S110, and then inputs the calculated current command value U to the motor driver 30. Then, the motor control unit 60 finishes the second control process. According to this control, the motor control unit 60 decelerates and stops the driven object 10 through the driving the motor 20 so that, in a time section from the time point Tb to the time point (Tb+Td), an acceleration peak value during the deceleration becomes −Ap (see FIGS. 3 and 7), the acceleration A and the speed V at the time point (Tb+Td) become zero, and then the position P at the time point (Tb+Td) becomes the target stop position Pt.

Figure 7:
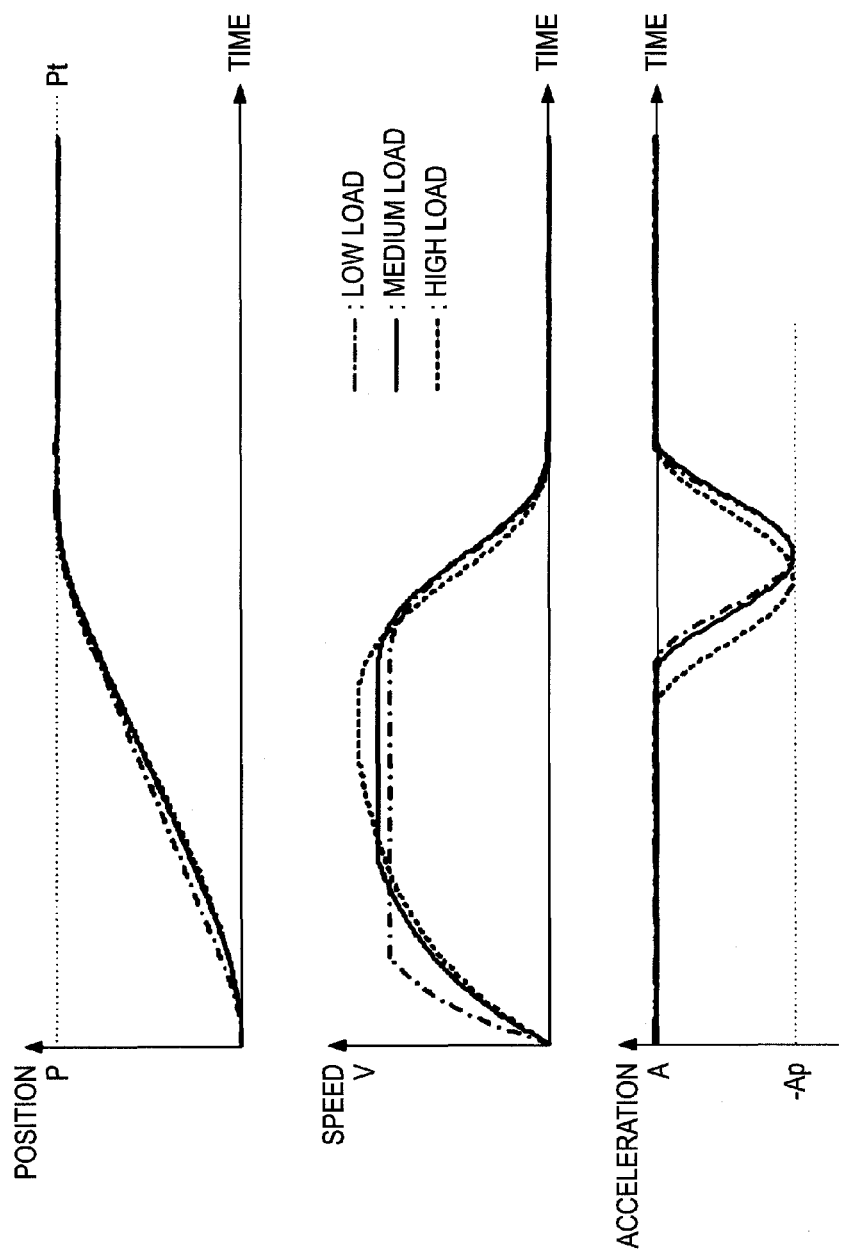
FIG. 7 illustrates graphs illustrating the trajectories of the position, speed, and acceleration of the driven object for each load levels.

FIG. 7 illustrates the trajectories of the position, speed, and acceleration of the driven object in response to load levels by the first control process and the second control process performed by the motor control unit 60. The speed Vm of the driven object 10 during the start of the second control process changes according to the load levels acting on the driven object 10. However, according to the present illustrative embodiment, the target profiles in the deceleration section are set so that the peak value of the acceleration of the deceleration section uniformly becomes the limit value −Ap of the acceleration feasible by the motor 20, regardless of the load levels.

When it is determined that the end time point (Tb+Td) of the deceleration section has come (Yes in step S230), in step S250, the motor control unit 60 sets 0 as the target acceleration Ar at the current time point t, sets 0 as the target speed Vr, and sets Pt as the target position Pr. Then, the motor control unit 60 proceeds to step S260 in which the motor control unit 60 calculates the current command value U so that the position P and speed V of the driven object 10 corresponds with their target values (the target acceleration Ar, the target speed Vr, and the target position Pr), and then inputs the current command value U to the motor driver 30. Then, the motor control unit 60 finishes the second control process.

The motor control unit 60 periodically and repeatedly performs the main control process that includes the second control process having the above described configurations, as shown in FIG. 5, and when a control finish condition is satisfied, the motor control unit 60 finishes the periodic process. According to this operation, the time period from the driving start time point (t=0) of the driven object 10 to the stop time point of the driven object 10 becomes almost constant, regardless of the load levels, so that the driven object 10 accurately stops at the target stop position Pt. Further, when the position P of the driven object 10 obtained from the position detector 50 does not change for a predetermined time period, the motor control unit 60 may determine that the driven object 10 has stopped, and finish the periodic process.

As described above, according to the configuration of the control system 1 of the present illustrative embodiment, at the beginning of the driving control for conveying the driven object 10 and stopping the driven object 10 at the target stop position Pt, the upper current limit Umax capable of being input to the motor 20 is estimated, and the motor 20 is driven by the driving current corresponding to the upper current limit Umax. Therefore, it is possible to convey the driven object 10 at high speed. Further, since the timing of the switching to the second control process is adjusted by comparing between the amount Pn necessary for stop and the remaining conveyance amount Pm, it is possible to drive the motor by the upper current limit Umax for a long time within a range in which it is expected that the accuracy of the stop will not be deteriorated. Furthermore, in the present illustrative embodiment, since the peak value of the acceleration during the deceleration is uniformly adjusted to the limit value −Ap of the acceleration feasible by the motor 20, it is possible to decelerate and stop the driven object 10 by using the capable limit of the motor 20, and it is possible to stop the driven object 10 at the target stop position at high speed with a high degree of accuracy.

Also, according to the present illustrative embodiment, the driving time period which is a time period from the start of the driving control on the driven object 10 to the stop of the driven object 10 is almost constant, regardless of the load levels. Therefore, it is possible to suppress a variation in time for stopping the driven object 10 at the target stop position. For example, when using a control system in which there is a variation in time for stopping the driven object at the target stop position for sheet conveyance of an image forming apparatus (such as the ink-jet printer 100), according to the loads of sheet conveyance mechanism, a variation may occur in sheet conveyance time for each apparatus (each product). Therefore, products having relatively short sheet conveyance time and products having relatively long sheet conveyance time may exist together. However, according to the control system 1 of the present illustrative embodiment, it is possible to suppress a variation in time for stopping the driven object 10 at the target stop position.

In other words, according to the control system 1 of the present illustrative embodiment, it is possible to achieve an improvement in the accuracy in stopping the driven object 10 at the target stop position, a reduction in time for stopping the driven object at the target stop position, and a suppression of a variation in the time for stopping the driven object at the target stop position with balancing them. Further, when this control system 1 is applied to an image forming apparatus such as the ink-jet printer 100, the conveyance time of the sheet 160 becomes constant so that it is possible to suppress a variation for each apparatus, and to displace the sheet 160 up to the target stop position. Therefore, it is possible to provide a good image forming apparatus.

Modified Embodiment

The control system 1 using the target profiles including the constant speed section and the deceleration section has been described. However, in order to reduce the time period until the driven object 10 is stopped at the target stop position Pt, the constant speed section may not provided to the target profiles.

A main control process of a modification, which is performed instead of the process shown in FIG. 5, by a motor control unit 60 of a control system 1, performs a second control process using target profiles having no constant speed section, that is a target speed monotonically decreases in the target profiles, will be described with reference to FIG. 8.

Figure 8:
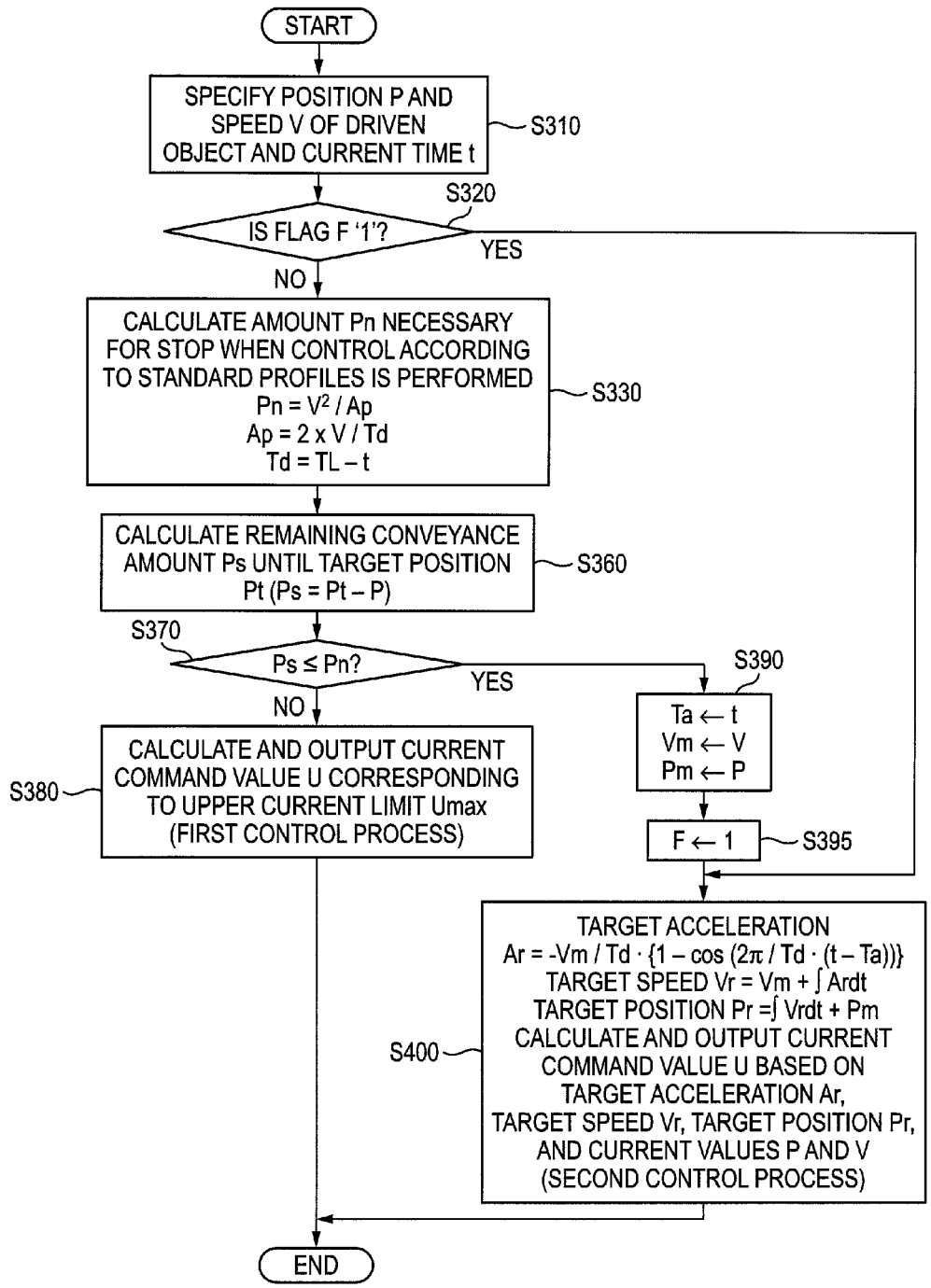
FIG. 8 is a flow chart illustrating a main control process of a modified embodiment.
Figure 9:
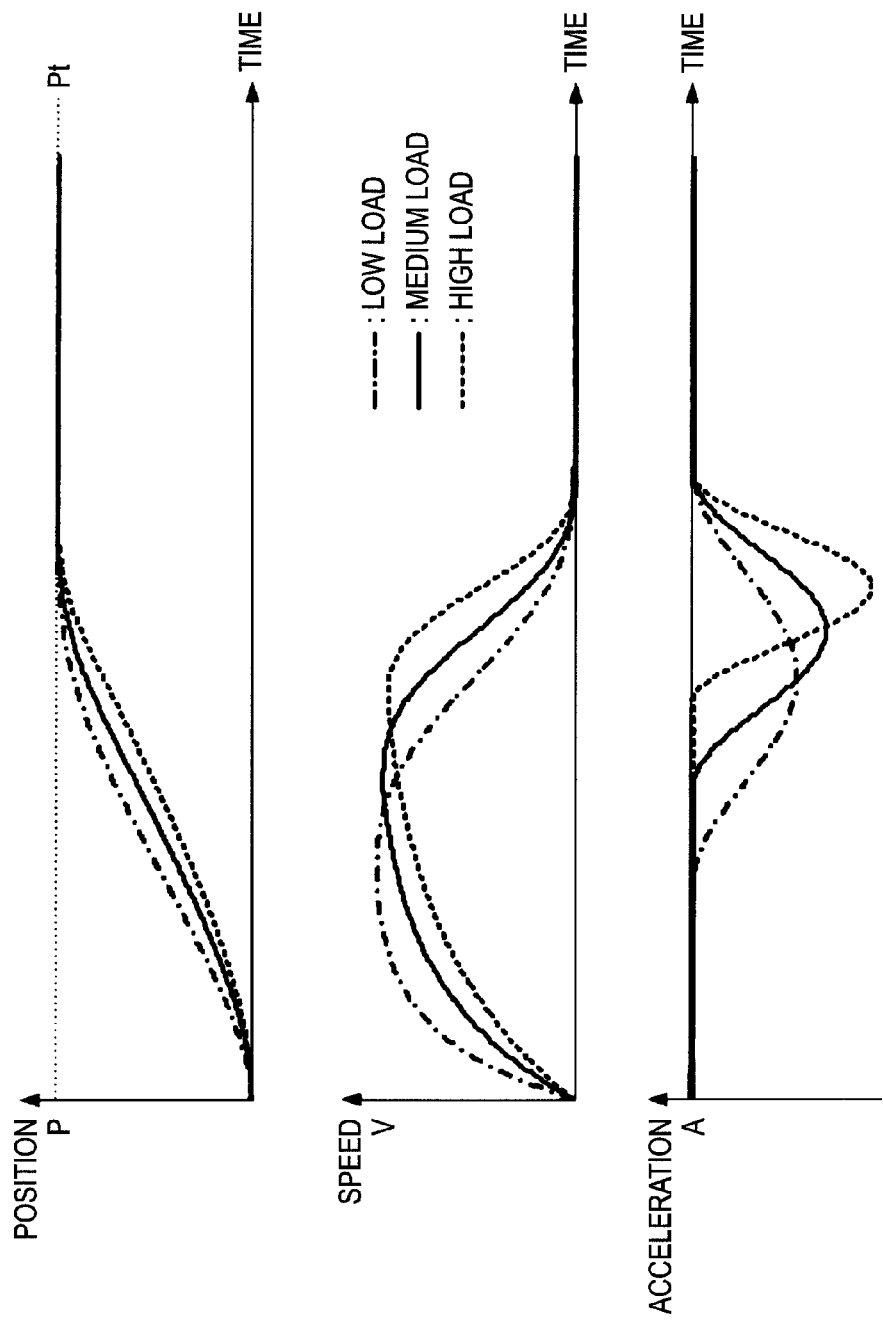
FIG. 9 illustrates graphs illustrating the trajectories of the position, speed, and acceleration of the driven object for some load levels according to the modified embodiment.

When the main control process shown in FIG. 8 starts, similarly to the process of step S110, in step S310, the motor control unit 60 specifies the position P and speed V of the driven object 10, and the elapsed time (current time point) t from the start of the driving control on the driven object 10. Next, in step S320, the motor control unit 60 determines whether the value of the flag F is 1. Then, when it is determined that the value of the flag F is 0 (No in step S320), in step S330, the motor control unit 60 calculates the amount Pn necessary for stop when the second control process according to the standard profiles starts at the current time point, based on the current speed V of the driven object 10 and the current time point t specified in step S310. Here, the standard profiles of this case illustrates the target acceleration Ar, the target speed Vr, and the target position Pr which are expressed as the following Equations. The meanings of the reference symbols Vm, Ta, TL, Ap, and the like basically corresponds to the above-mentioned illustrative embodiment. However, in this modification, since any constant speed section is not provided, the reference symbol 'Ta' represents the start time point of the control based on the standard profiles, and corresponds to a start time point of a deceleration section in a time system of time t.

Target Acceleration

[Equation 6]

$$A_r = -\frac{V_m}{T_d}\left\{1 - \cos\left(\frac{2\pi}{T_d}(t - T_a)\right)\right\} \quad (15)$$

$$A_p = 2 \times \frac{V_m}{T_d} \quad (16)$$

$$T_d = TL - T_a \quad (17)$$

Target Speed

[Equation 7] (18)

$$V_r = \int_{T_a}^{t} A_r \, dt + V_m \quad (18)$$

Target Position

[Equation 8] (19)

$$P_r = \int_{T_a}^{t} V_r \, dt + P_m \quad (19)$$

The amount Pn necessary for stop when the driving control on the driven object 10 according to those standard profiles has started is calculated by the following Equation.

$$Pn = Vm^2/Ap \quad (20)$$

As can be seen from the above-mentioned equations, the standard profiles of the present modification basically have the same shapes as the standard profiles in the deceleration section of the above-mentioned illustrative embodiment, but are different from the above-mentioned illustrative embodiment in that the deceleration time period Td and the absolute value Ap of the acceleration peak value are not fixed and is depending on the current time point t and the current speed V of the driven object 10. In the present modification, since any constant speed section is not provided, the time from the start of the driving control on the driven object 10 to the stop of the driven object 10 is adjusted to the constant value TL by adjusting the deceleration time period Td. According to this, the absolute value Ap of the acceleration peak value is not fixed and is adjusted to a value depending on the speed Vm and the deceleration time period Td as shown by Equation 16.

In other words, in step S330, the motor control unit 60 calculates the deceleration time period Td based on a difference between the current time point t and the target drive time period TL, calculates the absolute value Ap of the acceleration peak value necessary for stop based on the deceleration time period Td and the speed V (=Vm) of the driven object 10, and calculates the amount Pn necessary for stop, based on the absolute value Ap of the acceleration peak value and the speed V (=Vm).

After calculating the amount Pn necessary for stop as described above, in step S360, the motor control unit 60 calculates a remaining displacement amount Ps by the same method as that in step S160. Next, in step S370, the motor control unit 60 determines whether the remaining displacement amount Ps is equal to or less than the amount Pn necessary for stop.

Then, when the remaining displacement amount Ps is greater than the amount Pn necessary for stop (No in step S370), the motor control unit 60 performs the first control process as step S380, similarly to the process of the step S180, and finishes the main control process shown in FIG. 8. Meanwhile, when it is determined that the remaining displacement amount Ps is equal to or less than the amount Pn necessary for stop (Yes in step S370), the motor control unit 60 sets the current time point t to the start time point Ta of the second control process, sets the position P of the driven object 10 at that time, as the initial position Pm of the driven object 10 during the start of the second control process, and sets the speed V of the driven object 10 at that time point, thereby setting the same target profiles as the standard profiles, as target profiles to be used in the second control process. Next, in step S395, the motor control unit 60 sets 1 as the value of the flag F.

After this process, in step S400, the motor control unit 60 performs the second control process. In other words, in the second control process, based on the target profiles set by the process of step S390, the motor control unit 60 sets the target acceleration Ar of the driven object 10 at the current time point t to a value at the current time point t obtained by substituting the values Ta, Pm, and Vm set in step S390 into Equations 15 and 17, and sets then the target position Pr to a value at the current time point t according to Equation 19. Then, based on the current position P and speed V of the driven object 10 specified in the process of step S310, the motor control unit 60 calculates the current command value U corresponding to the motor 20 so that an error between the position P and speed V of the driven object 10 and the target values is reduced, and then inputs the calculated current command value U to the motor driver 30. Then, the motor control unit 60 finishes the second control process.

The motor control unit 60 periodically and repeatedly performs the main control process that includes the second control process having those configurations, as shown in FIG. 5, and when a control finish condition is satisfied, the motor control unit 60 finishes the periodic process. According to this operation, the motor control unit 60 performs the driving control on the driven object 10 so that the driven object 10 is decelerated in the time section from the time point Ta to the time point TL, and then stops at the time point TL. FIG. 8 illustrates the trajectories of the position, speed, and acceleration of the driven object 10 in response to load levels by the motor control unit 60 in present modification.

As described above, even in the configuration of the control system 1 according to the modification, it is possible to achieve an improvement in the accuracy in stopping the driven object 10 at the target stop position, a reduction in time for stopping the driven object at the target stop position, and suppression on a variation in the time for stopping the driven object at the target stop position while harmonizing them.

A correspondence relation between terms is as follows. Specifically, the motor control unit 60 corresponds to an example of a motor control unit, and the rotary encoder 40 corresponds to an example of a signal output unit. Further, the first control process performed by the motor control unit 60 corresponds to an example of a process that is implemented by a first control unit, the processes of steps S120, S170, S195, S320, S370, and S395 correspond to examples of processes that are implemented by a switching unit, and the processes of steps S191, S193, and S390 are examples of processes that are implemented by a second control unit. Further, the processes of steps S130 to S155, and S330 that are performed by the motor control unit 60 correspond to examples of processes that are implemented by a first calculating unit, and the processes of steps S160 and S360 that are performed by the motor control unit 60 correspond to examples of processes that are implemented by a second calculating unit. Furthermore, the main control unit 150 corresponds to an example of a conveyance control unit.

This disclosure is not limited to the above-mentioned illustrative embodiment, but can take various aspects. For example, in the above-mentioned illustrative embodiment, the motor control unit 60 specifies the position P and speed V of the driven object 10 based on the rotation position X of the motor 20 detected by the position detector 50, and the rotation speed ω of the motor 20 detected by the speed detector 55, and performs the driving control on the driven object 10 so that the position P and the speed V becomes the target values. However, since the rotation position X and rotation speed ω of the motor 20 and the position P and speed V of the driven object 10 are different from each other in their scales, as a matter of course, the motor control unit 60 may perform the motor control by directly using the rotation position X of the motor 20 detected by the position detector 50 and the rotation speed ω of the motor 20 detected by the speed detector 55, so that the rotation position X and rotation speed ω of the motor 20 becomes the target values, thereby indirectly performing the driving control on the driven object 10.

Also, in the above-mentioned illustrative embodiment, the rotary encoder 40 is connected to the rotation shaft of the motor 20 so that the position P and speed V of the driven object 10 are specified based on the rotation position X and rotation speed ω of the motor 20. However, the rotary encoder 40 may be connected to the driven object 10 so that the position P and speed V of the driven object 10 is directly detected by the rotary encoder 40. For example, the rotary encoder 40 can be connected to the rotation shaft of the conveyance roller 111. In this case, the rotation position X and rotation speed ω of the motor 20 can be specified based on the position P and speed V of the driven object 10.

The control system 1 of the present illustrative embodiment is not only applied to the ink-jet printer 100. In the above-mentioned illustrative embodiment, both of the position P and speed V of the driven object 10 are used to perform the control based on the target profiles. However, only one of the position P and speed V of the driven object 10 may be used to perform the control based on the target profiles.

Further, in the above-mentioned illustrative embodiment, in step S155, the constant-speed time period Tc is corrected to the lower limit Tcm. However, this correction is not necessarily performed. When the constant-speed time period is too short, in some apparatuses, it may be impossible to accurately perform the driving control. However, in case that such deterioration of the accuracy does not occur or is unlikely to occur in that apparatus, any lower limit for the constant-speed time period may not be provided. Additionally, in step S193, the constant-speed time period Tcr is calculated based on the target stop position Pt, the deceleration distance Pd, and the initial position Pm. However, without performing this process, the deceleration start time point Tb may be set to the time point (Ta+Tc).

What claimed is:
1. A motor control device comprising:
a motor control unit that controls a motor; and
a signal output unit that outputs a signal according to rotation of the motor,
wherein the motor control unit controls the motor based on an output signal of the signal output unit so that a driven object driven by the motor is displaced to a target stop position,
wherein the motor control unit is configured to function as:
a first control unit that performs a first motor control, in which an upper current limit, which is an upper limit of current applicable to the motor and is adjusted by current degradation caused by a counter-electromotive force, is estimated based on the output signal of the signal output unit, and in which a first control input corresponding to the estimated upper current limit is determined as a control input of the motor and then the motor is controlled based on the first control input;

a second control unit that performs a second motor control, in which a second control input of the motor is determined based on both of at least one of a displacement amount and a speed, as an operated amount of one of the motor or the driven object, specified by the output signal of the signal output unit and an target trajectory of the operated amount and then the motor is controlled based on the second control input;

a switching unit that enables the first control unit to perform the first motor control before a time point when a condition for start of the second motor control by the second control unit is satisfied and enables the second control unit to perform the second motor control, instead of the first control unit, after the time point when the condition for the start of the motor control by the second control unit is satisfied;

a first calculating unit that calculates a displacement amount of the driven object from the time point of start of the motor control by the second control unit to the time point of stop of the driven object, as an amount necessary for stop, in case that the second control unit starts the controlling of the motor based on a standard target trajectory, which is determined based on both of the speed specified by the output signal of the signal output unit and elapsed time from a driving start time point of the driven object, wherein a time period from the driving start time point of the driven object to the driving stop time point of the driven object in the standard target trajectory is constant, and a second calculating unit that calculates a remaining displacement amount of the driven object to the target stop position, based on the displacement amount specified by the output signal of the signal output unit, wherein, when the remaining displacement amount calculated by the second calculating unit reaches the amount necessary for stop calculated by the first calculating unit, the switching unit determines that the condition for start of the second motor control by the second control unit is satisfied and then starts the second motor control of the second control unit, and wherein, when the second control unit starts the motor control, the second control unit determines the control input of the motor, based on both of the operated amount specified by the output signal of the signal output unit and the target trajectory corresponding to the standard target trajectory and then starts the second motor control based on the control input to stop the driven object at the target stop position.

2. The motor control device according to claim 1,
wherein the target trajectory includes a constant speed section where the driven object moves at a constant speed and a deceleration section where the driven object moves with decelerating, wherein the deceleration section follows the constant speed section, wherein, in the standard target trajectory, a speed in the constant speed section and the target trajectory of the deceleration section are determined by the speed specified by the output signal of the signal output unit, and a time period of the constant speed section is determined based on the elapsed time from the driving start time point of the driven object, wherein, in the standard target trajectory, a time period from the driving start time point of the driven object to the driving stop time point of the driven object is constant.

3. The motor control device according to claim 2, wherein the target trajectory in the deceleration section is a target trajectory in which an acceleration peak value is set to be an uniformed acceleration value without depending on the speed specified from the output signal of the signal output unit.

4. The motor control device according to claim 2, wherein the target trajectory in the deceleration section is a target trajectory, in which an acceleration peak value is an uniformed acceleration value corresponding to a limit of acceleration feasible by the motor.

5. The motor control device according to claim 2,
wherein, when the second control unit starts the second motor control, the second control unit sets a corrected target trajectory, as a target trajectory corresponding to the standard target trajectory, and the second control unit controls the motor based on the corrected target trajectory, and wherein the corrected target trajectory is a target trajectory obtained by correcting the time period of the constant speed section in the standard target trajectory into a value obtained by dividing a difference between the remaining displacement amount of the driven object to the target stop position of the driven object and a displacement amount of the driven object in the deceleration section specified by the standard target trajectory, by the speed in the constant speed section.

6. The motor control device according to claim 2,
wherein, when the time period of the constant speed section in the standard target trajectory becomes less than a lower limit, the first calculating unit calculates, as the amount necessary for stop, the displacement amount of the driven object from the time point of the start of the second motor control by the second control unit to the driving stop time point of the driven object in case that the second control unit starts the motor control based on a semi-standard target trajectory which is a target trajectory obtained by correcting the time period of the constant speed section in the standard target trajectory into the lower limit, and wherein, when the remaining displacement amount reaches the amount necessary for stop based on the semi-standard target trajectory, the second control unit controls the motor based on target trajectory corresponding to the semi-standard target trajectory to stop the driven object at the target stop position.

7. The motor control device according to claim 1,
wherein the target trajectory is a target trajectory, in which the speed of the driven object monotonically decreases until the driven object stops, and wherein the standard target trajectory is a target trajectory, in which a deceleration time period, which is a time period from a time point of start of motor control based on the standard target trajectory to a time point of stop of the driven object speed, is determined based on the elapsed time from the driving start time point of the driven object, in which a deceleration distance, which is a displacement amount of the driven object from the time point of the start of the motor control based on the standard target trajectory to the driving stop time point of the driven object, is determined based on the deceleration time period and the speed specified by the output signal of the signal output unit, and in which a time period from the driving start time point of the driven object to the driving stop time point of the driven object is constant.

8. The motor control device according to claim 7, wherein the second control unit performs the motor control based on the same target trajectory as the standard target trajectory which is the target trajectory corresponding to the standard target trajectory.

9. An image forming apparatus comprising:
- a motor;
- a conveying unit that includes a roller driven by the motor and is configured to convey a driven recording medium by rotation of the roller;
- an image forming unit configured to form an image on the conveyed driven recording medium being stopped at the a target stop position by the conveying unit;
- the motor control device according to claim 1 configured to control the motor to drive the conveying unit so as to convey the driven recording medium to the target stop position, and
- a conveyance control unit configured to designate the target stop position and repeatedly operate the motor control device, so that the conveying unit stepwisely conveys the driven recording medium.

* * * * *